United States Patent [19]
Kahn et al.

[11] Patent Number: 5,822,788
[45] Date of Patent: Oct. 13, 1998

[54] MECHANISM FOR PREFETCHING TARGETS OF MEMORY DE-REFERENCE OPERATIONS IN A HIGH-PERFORMANCE PROCESSOR

[75] Inventors: Opher D. Kahn; Ilan Y. Spillinger, both of Haifa; Adi Yoaz, Talmay Menashe, all of Israel

[73] Assignee: Intel Corporation, Santa Clara, Calif.

[21] Appl. No.: 771,705

[22] Filed: Dec. 20, 1996

[51] Int. Cl.[6] .................................................. G06F 12/08
[52] U.S. Cl. ......................... 711/213; 711/220; 711/221
[58] Field of Search .................................. 711/204, 213, 711/220, 221

[56] References Cited

U.S. PATENT DOCUMENTS

| | | | |
|---|---|---|---|
| 5,210,838 | 5/1993 | Jensen | 711/213 |
| 5,537,573 | 7/1996 | Ware | 711/137 |
| 5,574,887 | 11/1996 | Fitch | 395/500 |
| 5,592,636 | 1/1997 | Popescu | 395/586 |
| 5,652,858 | 7/1997 | Okada | 711/137 |
| 5,694,568 | 12/1997 | Harrison | 711/213 |

OTHER PUBLICATIONS

Tien-Fu Chen, et al., "Effective Hardware-Based Data Prefetching for High-Performance Processors," pp. 609–623 (IEEE 1995).

Sharad Mehrota, et al., "Quantifying the Performance Potential of a Data Prefetch Mechanism for Pointer-Intensive and Numeric Programs," pp. 1–34 (Nov. 7, 1995).

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

A computer system provides enhanced performance when executing irregular code that include pointer de-reference operations. A memory controller of the computer system first fetches a pointer value from an address location in the memory and then calculates a new address adding a constant or scale factor to the pointer value. A logical-to-physical (i.e., virtual-to-physical) translation of the pointer value is also performed. The loading of data for the initial pointer load operation is overlapped with the de-reference operation, wherein the de-reference data is prefetched from memory using the resulting address and placed into the CPU's cache.

12 Claims, 5 Drawing Sheets

| IP | Constant | Phys_Page |
|---|---|---|
40 ~ | | | |
| | | |
| | | |
| | | |
| | | |

MECHANISM FOR PREFETCHING TARGETS OF MEMORY DE-REFERENCE OPERATIONS IN A HIGH-PERFORMANCE PROCESSOR

FIELD OF THE INVENTION

The present invention is generally related to the field of microprocessors.

More particularly, the invention relates to data prefetching schemes for reducing data access penalties in a high-performance processor.

BACKGROUND OF THE INVENTION

Practitioners in the art recognize that pointer de-referencing is becoming more prevalent in today's software languages such as C++ and various object-oriented languages. In other words, the trend among computer scientists and engineers is to produce code in which structures are created dynamically. This has created a new problem of how to efficiently handle pointer de-reference operations at the micro-architectural level of a computer system. Past approaches to solving this problem have attempted to enhance performance by focusing on improved data prefetching schemes.

Data prefetching is a subject that has been extensively explored in recent years as a way to dramatically improve microprocessor performance. The basic idea behind any prefetching scheme is to load the data references from external memory into an on-chip cache so that memory latency is hidden. When data references are available in a local cache memory of the processor, program execution precedes smoothly and rapidly. However, if data is not resident in the on-chip data cache, the processor must perform a bus cycle to access memory. This means that all of the dependent operations usually must have their execution postponed until the required data returns from memory. Hence, prefetching is aimed at bringing data into a cache local to the processor prior to the time the data is actually needed.

Both hardware and software-based data prefetching schemes have been used or proposed for reducing processor stall time due to memory latency. By way of example, an article entitled, "Effective Hardware-Based Data Prefetching for High-Performance Processors," by Tien-Fu Chen, et al. (IEEE 1995) describes a hardware-based prefetching scheme that keeps track of data access patterns in a reference prediction table. Utilizing a history of previous code, the table is constructed based on addresses generated in the previous iterations of an instruction pointer. Keeping track of data access patterns in this manner allows the address of the prefetch request to be calculated based upon the recorded history.

FIG. 1 illustrates a prior art approach of a reference prediction table 10 organized as an instruction cache for keeping track of previous reference addresses and associated strides for load and store instructions. In the computer arts, a stride is simply the difference between the addresses of the two most recent accesses for the same instruction. Reference prediction table 10 shown records the effective address of the memory operand, computes the stride for an access, and sets a state controlling the prefetching by comparing the previously recorded stride with the one just computed. Thus, the predicted prefetch address is based upon the past history for the same memory access instruction.

The authors of the above paper report improved performance in the case of an constant or local stride, where the stride is small, and also for scalar and zero stride memory access patterns. Unfortunately, when the memory access pattern is irregular the mechanism illustrated in FIG. 1 produces erroneous prefetches. This is a major problem since irregular memory access patterns appear frequently in certain types of code. In such situations, the hardware-based prefetching scheme of the prior art is useless.

Another data prefetching mechanism that relies upon recurrence-based classification of memory access patterns is described in a paper entitled, "Quantifying the Performance Potential of a Data Prefetch Mechanism for Pointer-Intensive and Numeric Programs," by Sharad Mehrota, et al. (dated Nov. 7, 1995). This paper describes the design of a prefetching mechanism which uses an indirect reference buffer (IRB) organized as two mutually cooperating sub-units; a recurrence recognition unit (RRU) and a prefetch unit (PU). In operation, the PU generates a prefetch using an indirect address stride computed after signaling by the RRU.

The problem with the foregoing IRB design, however, is that when a current operand access (e.g., a load) experiences a cache miss, the PU must wait idly until data is returned to the processor before it can generate the prefetch. The reason why is because the current low target register contents are not available to compose the prefetch address.

What is needed then is a new type of data prefetching mechanism that is capable of prefetching targets of memory de-reference operations, like those that typically occur in linked lists and other types of irregular code. As will be seen, the present invention provides an advanced prefetching mechanism which substantially enhances the processor performance when accessing data through a pointer de-reference.

SUMMARY OF THE INVENTION

A computer system with enhanced processor performance in accessing data through a pointer de-reference is disclosed. The invention prefetches data into a cache closely associated with the central processing unit (CPU) of the system at the same time the pointer is being accessed.

In traditional microprocessor-based computer systems when a pointer de-reference operation causes a cache miss in both the pointer load and the pointer de-reference stages, the CPU must wait until the pointer load has been served before performing the de-reference. In the case of cache misses, the time it takes to complete the entire de-reference sequence is approximately twice the cache miss service time; that is, two full accesses to the computer's main memory unit.

The present invention overcomes this problem by overlapping the two memory accesses of the de-reference operation. The pointer value is first fetched in a address location in the memory, and a new address is calculated by adding a constant or scale factor to the pointer value. A logical-to-physical (i.e., virtual-to-physical) translation of the pointer value is also performed. In an embodiment described below, these two steps are completed by a memory controller of the computer system.

Based on the resulting address from the calculation performed on the pointer value logical-to-physical translation, de-reference data is then prefetched from the memory and placed into the cache. This latter step sends the relevant cache line to the data cache most closely associated with the CPU.

Most often, this is a local (L0) data cache that is part of the same integrated circuit as the CPU. Thus, according to the invention, the de-reference data cache line arrives at the CPU much earlier as compared to conventional computer systems.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

DETAILED DESCRIPTION

The computer system of the present invention includes a mechanism for prefetching data into a cache closely associated with a CPU. In the following description, numerous specific details are set forth, such as memory organizations, logic blocks, address translation devices, etc., in order to provide a thorough understanding of the present invention. Practitioners having ordinary skill in the data processing arts will understand that the invention may be practiced without many of these specific details. In other instances, well-known signal timings, components, and circuits have not been described in detail to avoid obscuring the invention.

Figure 1:
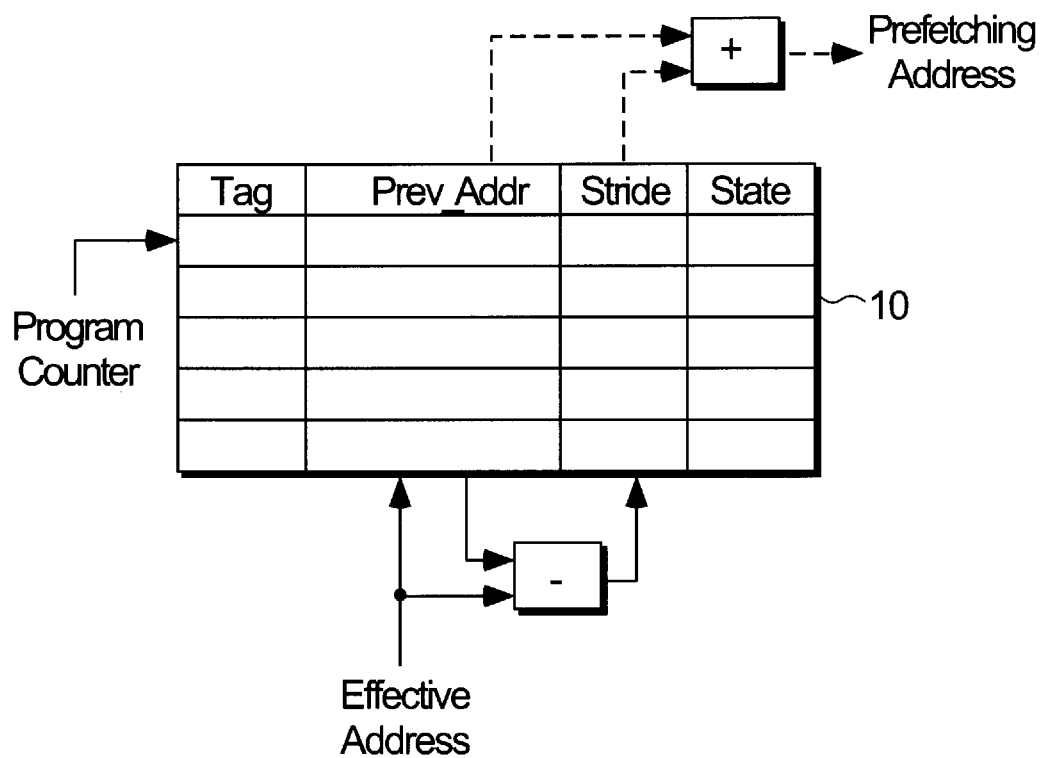
FIG. 1 illustrates a reference prediction table used in a prior art prefetching scheme.
Figure 2:
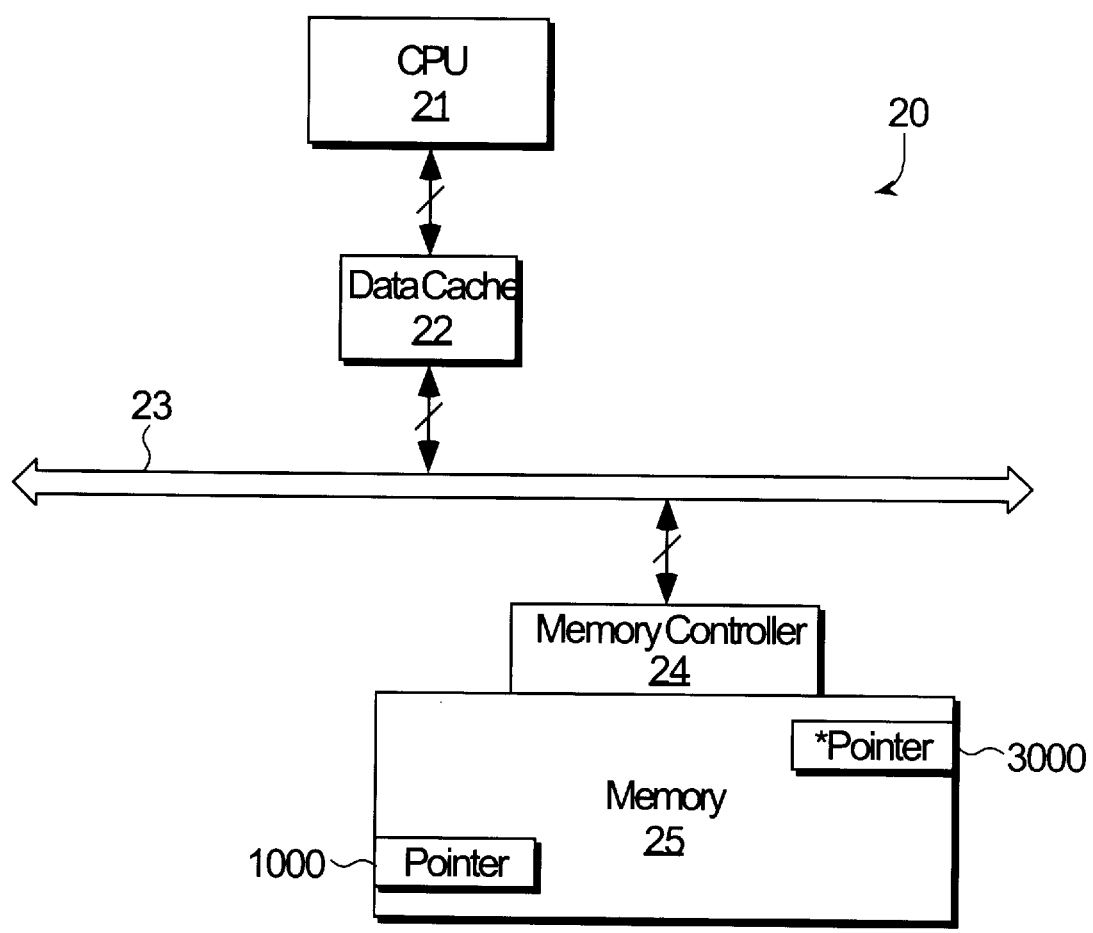
FIG. 2 is a high-level block diagram illustrating a memory organization for the computer system of the present invention.

FIG. 2 illustrates, in block diagram form, a computer system 20 that includes a CPU 21 coupled to a data cache 22. Data cache 22, in turn, is coupled to a bus 23 which may comprise a local or a system bus used for transferring information between CPU 21 and a memory 25. Memory 25 may comprise a main memory, or another level of memory in a memory hierarchy of system 20. The computer system of FIG. 2 also comprises a memory controller 24 for controlling data accesses to memory 25. Memory controller 24 is shown coupling memory to bus 23.

Data cache 22 comprises either a first level data cache (L0) that is closely associated with CPU 21, or a parallel cache that is similarly closely coupled to the processor. In certain applications, a parallel cache might be preferred since the data being prefetched is usually an estimate of what is required in the near future. The advantage of a parallel cache implementation is that if the prefetched data is not needed, the first level data cache remains unpolluted.

The computer system of FIG. 2 includes a novel mechanism for expeditious handling of pointer de-reference operations. Pointer de-referencing code is normally manifested by irregular structures and data patterns. Typical examples include linked lists and function pointer tables, where the entries within an array point to a particular function. One common characteristic of pointer de-referencing code is the requirement of two memory access operations. The first memory operation is a read access to load the pointer, This is followed by a second memory de-reference operation to read what it is that the pointer points to. Basically, the code sequence for servicing a pointer de-reference operation is represented by the following.

LOAD ptr
READ *ptr where the "*" denotes the location where the pointer is pointing.

To better understand the present invention, first consider how a standard machine performs prefetching operations when a pointer de-reference is encountered in the code. Referring to the timing diagram of FIG. 3, assume the following example code.

$R_1$=(pointer+4)

The problem with prefetching data for this code is that the address being pointed to is essentially unknown; nor does it conform to any regular pattern or structure. That is, until the address has been loaded from memory, prefetching can not be performed. Again, the reason why is because there is no established order with respect to the physical addresses for the memory de-reference operation.

Figure 3:
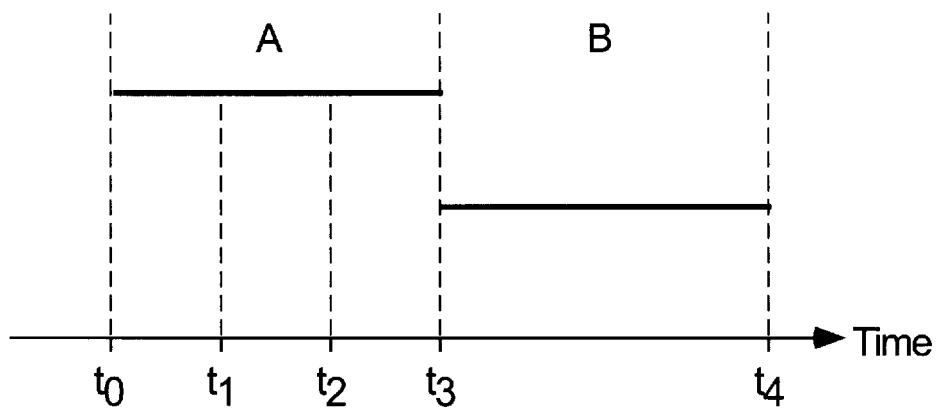
FIG. 3 is a timing diagram showing consecutive memory accesses of a de-reference operation in accordance with the prior art.

The conventional machine of FIG. 3 handles the pointer de-reference operation by performing two memory requests, illustrated by consecutive memory cycles "A" and "B". Say, the pointer is in location 1000 in memory, and contains (i.e., points to) location 3000. The standard machine performs this de-reference operation by issuing the following two requests.

tmp=load (1000) (Request A)
$r_1$=load (tmp+4) (Request B)

Assuming that the first load operation is a cache miss, the first request arrives at the memory controller at time $t_1$, as shown in FIG. 3. At time $t_2$, the data is sent by the memory controller back to the CPU. The first memory request cycle is completed at time $t_3$. At this point, data is available to the CPU, and the second request (i.e., the second memory load access) may commence. The obvious disadvantage of this prior art system is that two full cache miss service times are required to perform both loads.

The present invention will now be discussed in conjunction with illustrations of FIGS. 2 and 4. In one aspect of the present invention, a small amount of additional hardware is included in memory controller 24 to allow the two memory accesses needed for the de-referenced operation to be strongly overlapped with each other. When memory controller 24 services the pointer load (i.e., the first memory access operation in the pair) the additional hardware enables memory controller 24 to perform the following steps.

Memory controller 24 performs a first memory access to the addressed location, sending back the cache line data to the CPU 21. Controller 24 also takes the pointer value and performs a simple address calculation by adding either a constant to the pointer value, or by multiplying the pointer value by a scale factor. A logical-to-physical address translation is also performed to obtain the physical page for the second memory request. At this stage, the de-reference data can be prefetched using the resultant address from the calculation and the physical address from the translation. The relevant cache line thus obtained is then sent back to CPU 21.

Figure 4:
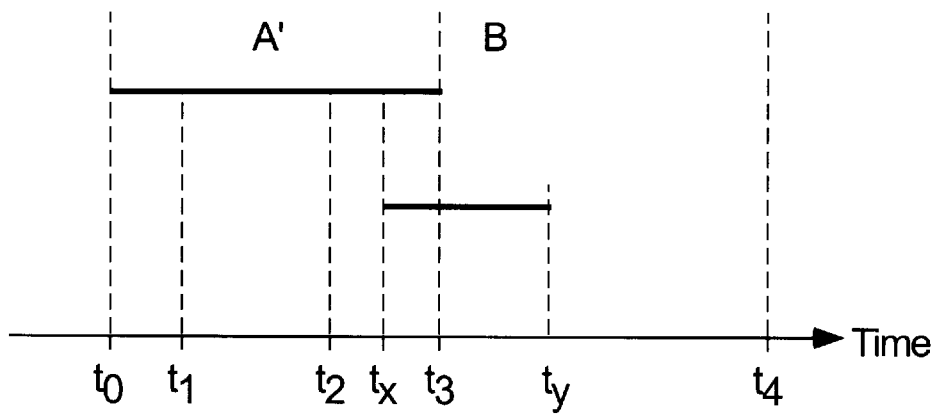
FIG. 4 is a timing diagram showing overlapped memory access cycles in accordance with the present invention.

The main advantage offered by the present invention is illustrated in the timing diagram in FIG. 4. With pointer de-reference prefetching, the system of the present invention performs the following operations.

tmp=load-and-prefetch (1000) (Request A')
$r_1$=load (tmp+4) (Request B)

The first memory request (Request A') arrives at memory controller 24 at time $t_1$. Memory controller 24 accesses memory 25 and returns the data at that location back to CPU 21 at time $t_2$. Shortly thereafter, at time $t_x$, memory controller 24 takes the value stored in location 1000 and performs an address calculation and page translation. In the current example, the pointer value is 3000 and the constant being added is 4. As will be described in more detailed shortly, a history table may be contained within CPU 21 to keep track of the address calculations performed for previous de-reference operations.

Note that at time $t_x$, the cache line containing the resulting address is also forwarded to data cache 22. This means that by time $t_y$, the data for the second request (Request B) is available and can be satisfied out of data cache 22. The overall result achieved by the present invention is a significant time savings, represented as the difference between $t_4$ and $t_y$.

Figures 5, 6:
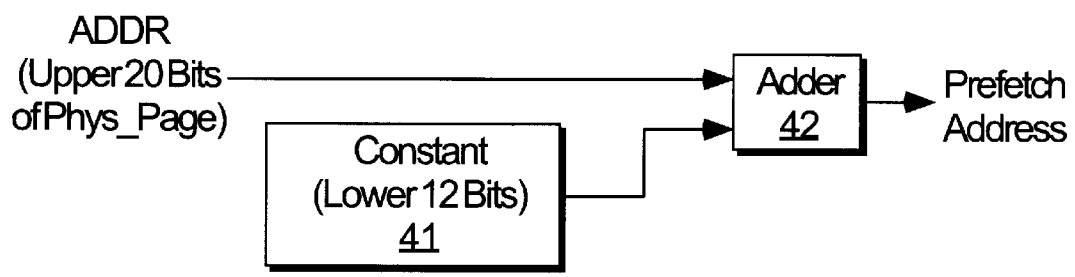
FIG. 5 shows a history table utilized in one embodiment of the present invention.
FIG. 6 is a circuit diagram useful for implementing an address calculation for one embodiment of the present invention.

Practitioners working in the field of computer systems will no doubt recognize that there are many different ways in which the present invention can be implemented. For example, FIG. 5 shows a history table 40 based on instruction pointers (IPs) that cause de-referencing operations. Table 40 is constructed to store information on de-reference sequences based on the instruction pointer of the first load reference (e.g., Request A'). In the particular embodiment shown, table 40 also keeps track of the physical page in which the last de-reference occurred. The advantage of this approach is that the next de-reference is frequently to the same physical page as where the last de-reference occurred. By way of the foregoing example, the logical-to-physical translation of the value 3000 (i.e., the pointer value at the address location of the first request) would be contained within the physical page field of the corresponding instruction pointer.

Table 40 also contains the resultant address calculated for the de-reference memory operation, such as a constant being added or multiplication by a scale factor. By creating table 40 and indexing it by an instruction pointer, de-reference data prefetching is triggered in a relatively straightforward manner. In the cases where the prediction provided by table 40 is correct, processor performance is greatly enhanced.

Hence, the present invention significantly reduces the total time needed to perform pointer de-reference operations by efficient use of a memory controller to perform operations that are in the critical timing path. The CPU 21 simply consults table 40 during program execution to obtain relevant history information useful in predicting when a load operation previously seen for an instruction pointer will again cause a de-reference. The CPU can also utilize the table to predict the target physical page, e.g., the same page as in the last instance for the particular instruction pointer.

During normal operation of computer system 20, when the first load instruction causes a cache miss, and the first load is contained in de-reference table 40, a special load cycle is generated. This special load cycle indicates to memory controller 24 to perform the de-reference operation in accordance with the above described method. To reiterate, memory controller 24 reads the pointer value contained at the first address location and also forwards the load data back to CPU 21. At the same time, an address calculation and a logic-to-physical translation is performed using the pointer value. The memory controller then forwards the cache line containing the de-reference data to data cache 22, closely associated with CPU 21.

FIG. 6 shows one implementation of the address calculation hardware of the present invention. In FIG. 6, constant block 41 represents the lower 12 bits of the address. An adder 42 is coupled to receive the constant at one input, and the upper 20 bits of the physical page address at its other input. By concatenating the upper 20 bits and the lower 12 bits, adder 42 generates the resulting prefetch address for the second memory access request of the de-reference pair. Note that the implementation shown in FIG. 6 contains only one source register, a constant and/or a scale factor. The first load (i.e., request A') which fetches the pointer value can be of any complexity since that address is generated by CPU 21, and not by memory controller 24. This greatly simplifies the hardware required to be included within memory controller 24.

The logical-to-physical translation of the pointer value can also be performed in a variety of ways. Of course, one approach has already been described above; namely, wherein CPU 21 sends a predicted physical page number along with the special load cycle. This prediction can be based on the last physical page access by the same de-reference operation. Alternatively, the prediction can be based upon some other algorithm.

A second approach is to have CPU 21 send a small working set of logical-to-physical translations obtained from de-reference table 40 to memory controller 24 along with the special load cycle. For example, this small working set of translations can be based upon the most recently accessed set of de-reference operations. These translations can easily be maintained within memory controller 24. Essentially, memory controller 24 includes a translation-look-aside buffer (TLB) which contains the small working set of translations representing the most recent prediction history. This memory controller TLB would have the same structure and operate in the same manner as an ordinary CPU TLB. It is appreciated that this approach is advantageous in that the number of bits that must be sent out for every access is much smaller. The reason why is because the TLB of the memory controller performs the translation, as opposed to the first approach discussed above in which 20 or more bits of address information associated with the physical page address is required for each special load cycle.

Yet another approach is to have a full translation-look-aside buffer embodied within memory controller 24. In essence, the full TLB of the memory controller is a copy of the set-associative TLB of CPU 21. In this way, memory controller 24 simply looks up any logical-to-physical translation that it may encounter. In the event that the appropriate translation is not contained within the memory controller's TLB, the controller can simply abort the de-reference operation. Persons familiar with the computer arts will understood that such a full TLB resident within memory controller 24 may not be kept fully coherent with the TLB of CPU 21.

Figure 7:
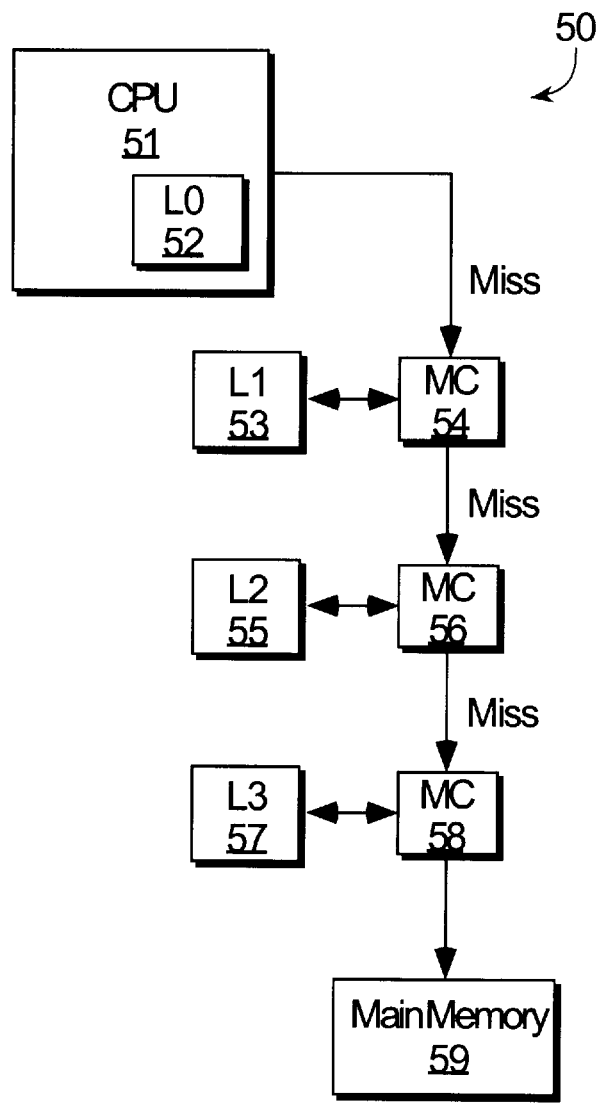
FIG. 7 is a block diagram illustrating a memory hierarchy organization of another embodiment of the presently invented computer system.

With reference now to FIG. 7, there is shown a block diagram of a system 50 containing multiple levels of cache memory organized in a hierarchy. Within system 50, a first level, local (L0) cache 52 is integrated with CPU 51. CPU 51 is also coupled to lower level caches 53, 55, and 57. Each of caches 53, 55, and 57 is respectively associated with memory controllers 54, 56, and 58. At the bottom of the memory hierarchy is main memory 59.

For the embodiment of FIG. 7, the de-referencing unit can be placed at any of the memory hierarchy locations, configured to operate in the same manner described above. Alternatively, each of the memory controllers 54, 56, and 58 may incorporate de-referencing hardware. In the latter case, the memory controller which finds the pointer data at a particular hierarchy level will be the controller that performs the de-reference operation. In other words, whichever cache in the hierarchy contains the pointer data, the memory controller associated with that cache is the one that looks for the target data. The controller may check in its own cache storage locations, or, if a miss occurs, the controller checks the cache of the next lower level of the hierarchy, and so on, until the target data is found.

FIG. 7 provides an example which shows cache misses occurring at levels L0, L1, and L2 in the memory hierarchy. In accordance with the described embodiment, memory controller 58 finds the pointer data in cache L3. Memory controller 58 performs the de-reference operation by looking for the target data, located either in cache 57 or in main memory 59. It is appreciated that the farther down the memory hierarchy the data target data is located, the greater the reduction in data miss rate and penalty seen by the pointer de-reference code.

Thus, the computer system of the present invention enhances processor performance, especially when running irregular code such as languages like C++ or object-oriented languages that greatly rely upon dynamically-created software structures.

We claim:

1. In a computer system which includes a central processing unit (CPU) coupled with a cache, a memory, and a memory controller that accesses the memory, a method of performing a pointer de-referencing operation comprising the steps of:

a. issuing, by the CPU, a first load request;

b. accessing, by the memory controller, an address location in the memory to retrieve a line of data responsive to the first load request, the line of data including a pointer value;

c. forwarding, by the memory controller, the line of data to the CPU while calculating, by the memory controller, a new address from the pointer value, d. producing, by the memory controller, a resultant address that is a logical-to-physical address translation of the pointer value; and e. prefetching, by the memory controller, de-reference data from the memory using the resultant address into the cache.

2. The method according to claim 1 wherein step (d) comprises the step of indexing a table that contains the resultant address.

3. The method according to claim 1 wherein the calculation of step (c) comprises the step of adding a constant to the pointer value.

4. A computer system comprising:

a central processing unit (CPU) having a de-reference table that contains information on a pointer de-reference sequence, the information being based on an instruction pointer of a first load operation of the pointer de-reference sequence;

a data cache coupled to the CPU:

a memory hierarchy coupled to the CPU, the memory hierarchy including one or more data caches and a main memory; and memory controller means for accessing data stored within the memory hierarchy, the memory controller means including means for performing a de-reference operation responsive to a special load cycle of the CPU by reading a pointer value at an address location in the memory hierarchy associated with the special load cycle, calculating a new address from the pointer value, providing a prefetch address, which is a logical-to-physical translation of the new address, and forwarding de-reference data to the data cache based upon the prefetch address.

5. The computer system of claim 4 where the memory controller means comprises a plurality of memory controllers, each associated with a different level of the memory hierarchy.

6. The computer system of claim 4 wherein the CPU sends a target physical page number to the memory controller with the special load cycle.

7. The computer system of claim 6 wherein the target physical page number is contained within the information of the de-reference table.

8. The computer system of claim 4 wherein the CPU sends a working set of logical-to-physical translations to the memory controller with the special load cycle, the working set containing the prefetch address.

9. The computer system claim 6 wherein the target physical page number is identical to a previous target physical page number associated with a last instance of the instruction pointer.

10. The computer system of claim 4 where the means of performing the de-reference operation comprises:

an adder having first and second inputs and an output;

a constant coupled to the first input to the adder;

a source register that stores the pointer value, the source register being coupled to the second input of the adder, at the output the adder producing a sum of the pointer value and the constant, the sum being the new address.

11. The computer system of claim 10 wherein the constant comprises a lower 12 bits of the new address.

12. The computer system of claim 11 wherein the pointer value comprises an upper 20 bits of the new address.

* * * * *